United States Patent Office 3,384,396
Patented May 21, 1968

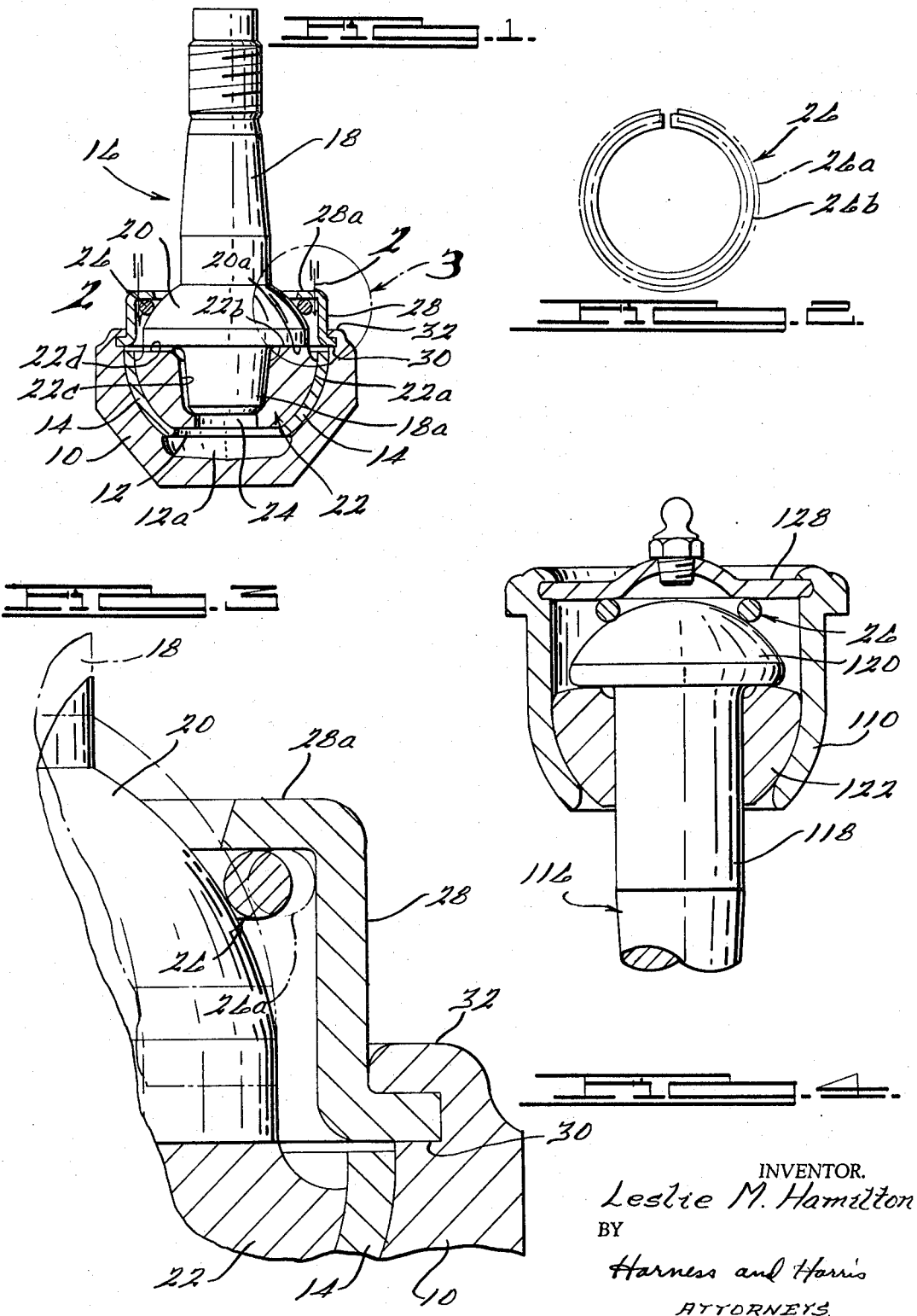

3,384,396
BALL AND SOCKET JOINT ASSEMBLY
Leslie M. Hamilton, Muncie, Ind., assignor to Chrysler Corporation, Highland Park, Mich., a corporation of Delaware
Filed Jan. 3, 1966, Ser. No. 518,241
1 Claim. (Cl. 287—87)

ABSTRACT OF THE DISCLOSURE

A ball joint wherein a substantially uniform pre-load seating pressure is automatically maintained on the ball and socket components throughout the life of the joint. The preloading is accomplished by means of a ring bearing member which is carried on the ball portion of the joint and in engagement with a cap member which at least partially covers the upper surface of the ball. In order for the stud portion of the joint to unseat, the bearing member must simultaneously undergo a radial expansion generally normal to the movement of the stud. Accordingly, the force required to unseat the stud is much greater than the preload force exerted by the bearing member.

---

This invention relates to mechanical joints and more particularly to those of a character known as ball joints. Such joints are well known and find use, for example, in drag link, control arm, and tie rod connections of automotive vehicles.

Generally, the ball and socket components of a ball joint are carefully matched and machined in order to keep friction at a minimum and thereby provide for ease of relative movement therebetween. In addition, ball joints are generally provided with springs which serve to preload the joint thereby keeping the ball portion of the joint firmly in contact with the socket portion so as to avoid loose fit or "play" from developing in the joint as a result of service wear. Unfortunately, thus far, the provision of such wear compensating means has resulted in a ball joint which is larger in size than desirable or which is costly to manufacture. It is recognized that ball joints are frequently employed in locations where available space is at a minimum and, accordingly, it has been attempted to overcome the joint size problem by merely reducing the dimensions of conventional wear compensating springs. This approach has not been successful since the compensating springs do not place a sufficient preload on the joint. Naturally, inadequate preload does not compensate for wear which develops in the joint after a period of service. However, experience has shown that inadequate preload results in a more immediate problem. For example, when an automobile is safety inspected it is conventional for the vehicle to be placed upon a hoist such that its wheels do not carry the vehicle weight. Accordingly, at this time, certain of the ball joints of the vehicle are subjected to axial forces which tend to unseat the ball portion of the joint from the socket. If the compensating springs do not adequately load the joint, it then sounds loose to the person making the inspection which frequently means that the joint will be thought to be worn and requiring replacement when in fact such is not the case.

Accordingly, it is an object of this invention to provide a play-free ball joint.

A further object is to provide a ball joint arrangement having a wear compensating and retaining means which occupies a minimum of space.

Yet another object is to provide a self-adjusting ball joint which automatically compensates for wear, has a minimum number of component parts and is easy to manufacture and assemble.

A further object is the provision of a ball joint wherein a substantially uniform pre-load seating pressure is automatically maintained on the ball and socket components throughout the life of the joint.

According to the present invention, a ball and socket joint is provided which is composed of cooperating housing and stud members. The stud member is provided with a generally rounded head portion which is rotatably journaled in a substantially mating cavity formed in the housing. In order to maintain a substantially uniform or constant bearing pressure between the stud head portion and the supporting bearing surface of the housing cavity, a bearing member is provided which will also automatically compensate for wear throughout the life of the joint. The bearing member is unique in that it is carried by the head portion of the stud and is of a configuration such that it does not extend outwardly beyond either the outermost vertical or horizontal peripheral surface of the head portion. Therefore, the bearing member does not increase the size of the ball joint. In addition the bearing member is elastic so that it automatically expands and contracts about the stud head portion so as to maintain a generally constant load on the joint. Moreover, due to its elastic property, it automatically contracts about the stud head portion to compensate for wear of joint components.

The above and other objects, features and advantages of this invention will be apparent from the following detailed description of a preferred embodiment of the invention and from the accompanying drawings wherein:

FIGURE 1 is a sectional elevational view of a compression type ball joint embodying one form of this invention;

FIGURE 2 is a plan view of the wear compensating and retaining bearing of this invention, other components being omitted for purposes of clarity, taken generally on the line 2—2 of FIGURE 1 illustrating in solid lines its radially contracted configuration and in phantom lines its radially expanded configuration.

FIGURE 3 is an enlarged view of a portion of the ball joint as illustrated in FIGURE 1. The portion being indicated generally by the area desingated as 3 and showing, in phantom lines, positions of the joint components when the stud is unseated; and FIGURE 4 is a sectional elevational view of a tension type ball joint constructed in accordance with this invention.

Referring now to FIGURE 1 of the drawing, a compression type ball joint is illustrated which comprises a housing 10 which can be an integral portion of a tie rod or the like (not shown). The housing 10 is provided with a chamber 12 which defines a lower cavity portion 12a which is suitable for containing grease or other lubricants. A thin-walled bushing or sleeve 14 which is open at both its top and bottom is secured to the interior side wall of the chamber 12 so as to form a wear lining. A stud, generally indicated by numeral 16, has a shank 18 and is provided with a ball-like head portion which is rotatably journaled within chamber 12. To facilitate better lubricant distribution, the ball-like head portion is composed of two component parts each having a curvilinear surface of different radius. The upper, generally spherical or rounded head portion 20 is an integral part of the stud 16 and extends radially outward from the shank 18 near an end portion 18a thereof. The lower portion of the ball-like head is a generally hemispherical member 22 which is disposed in chamber 12 so that its curvilinear side wall 22a is in slidable engagement with bushing 14. Member 22 is provided with a passageway 24 extending through the member which receives the lower shank portion 18a of stud 16 such that the generally planar surface 20a of head portion 20 seats against the surface 22b of member 22.

As mentioned above, this particular ball head construction provides for good lubricant distribution since lubricant contained in cavity 12a can travel through passageway 24 and a plurality of recesses or grooves 22c, 22d which are formed respectively, in the wall defining passageway 24 and in surface 22b of member 22. Lubricant can be supplied to cavity 12a through a removable plug or grease fitting (not shown). It will be understood of course that for purposes of this invention, the ball head can be of single piece construction and need only have a generally round peripheral surface as opposed to being perfectly spherical.

Retaining means for maintaining a substantially uniform or constant bearing pressure between the ball-like head portion of stud 16 and bushing 14, thereby restraining movement of the stud with respect to the housing 10, is provided which comprises a bearing member 26 that is disposed on the upper head portion 20 of stud 16. Bearing 26 is a resilient annular shaped member which is urged into contact with head portion 20 by means of a cap 28 which seats on a shoulder 30 of housing 10 and is secured thereto by means of housing lip 32 which is pressed into engagement with cap 28.

As seen with reference to FIGURE 2, bearing member 26 is a C-shaped ring or garter spring. Furthermore, the bearing member is fabricated from an elastic material such as spring steel so that it is self-adjustable from a radially expanded condition 26a to a contracted position 26b. As seen with reference to FIGURES 1 and 3, bearing member 26 is illustrated as having a circular cross-sectional area. However, the cross sectional configuration can be varied to provide for other than line contact between the bearing member 26 and stud head portion 20, if desired.

In assembling the ball joint, the bearing member 26 is placed on the head portion 20 and the cap 28 is positioned about the ball head such that an inwardly extending lip 28a or other portion of cap 28 engages the bearing member 26. The cap is then secured to the housing 10 by pressing it downwardly onto shoulder 30. The downward movement of cap 28 causes the annular bearing member 26 to radially expand and seat against head portion 20. As seen with reference to FIGURE 3, the annular bearing member 26 is in contact with cap portion 28a and stud head portion 20 thereby firmly seating the ball-like head of stud 16 within chamber 12 of housing 10.

In operation, the annular bearing member 26 constantly tends to radially contract due to its elastic property and, therefore, the bearing member will automatically compensate for wear throughout the life of the joint. Likewise, the ball joint is extremely resistant to forces which would tend to unseat the stud member from the housing. Thus, as shown in FIGURE 3, in order for the upper head portion 20 to move to an unseated position shown by phantom lines, the annular bearing member 26 will simultaneously therewith be required to undergo a radial expansion, in a direction generally normal to the movement of the stud, to a position as indicated by phantom lines 26a. Accordingly, it will be appreciated that the force required to unseat the stud is much greater than the preload force exerted on the stud by the bearing member 26. This is a significant advantage since the objective in a ball joint assembly is to keep friction as between the stud and housing components to a minimum while at the same time requiring a maximum force to unseat the stud.

A second embodiment of the invention is set forth in FIGURE 4, which illustrates a ball joint designed to operate under tension as opposed to the compression type ball joint illustrated in FIGURE 1. In this form of the invention, the head portion 120 of stud 116 is seated on member 122 which is rotatably journaled in housing 110. A bearing member 26 is sandwiched between a cap 128 and the rounded peripheral surface of stud head portion 120 and securely seats the head portion 120 against member 122 as well as urges member 122 into bearing relationship with the interior walls of the housing 110. As heretofore described, the bearing member 26 is normally sandwiched between the cap and stud head portion so as to be in a radially expanded state and will thereby serve to both compensate for wear, and preload the joint, due to its propensity to radially contract. Likewise, in order for the stud to be unseated, the bearing member will have to expand radially in a direction generally normal to the movement of the stud. Accordingly, the force needed to unseat the stud will have to be greater than the preload force. It will be understood, of course, that the degree of preload can be varied through proper selection of bearing material, diameter of bearing and configuration of the cap.

With the operation and construction of the arrangement of this invention in mind, several important features will be recognized. Thus, it will be noted that both preloading and wear compensating means are combined in a single, inexpensive bearing member which can easily be incorporated into a ball joint. More importantly, the bearing member requires a minimum of space and does not add to the physical size of the ball joint. In addition, since the bearing and cap do not extend upwardly along the shank portion of the stud, both members lying instead below the juncture of the stud shank and head portion, they do not interfere with angular travel of the stud. Lastly, since the bearing member expands and contracts in a direction generally normal to the direction that the stud must move in order for it to unseat, the force required to unseat the stud must be substantially greater than the preload acting on the stud. Thus, for example, tests have shown that a force of about 130 pounds may be required to unseat the stud portion of a ball joint which is constructed in accordance with the invention so as to have a preload of about 50 pounds.

From the foregoing description it is apparent that the objects of this invention have been obtained, and it will be understood that modification and variations may be effected without departing from the scope of the novel concepts of the present invention as defined in the appended claim.

I claim:

1. A ball joint comprising a cup-shaped housing having an open ended chamber, a truncated ball-like member disposed in said chamber and having an opening, a stud having a stub end received in said opening and a segmental spherical head portion adjacent said stub end, a cap secured to said housing adjacent said open end of said chamber and extending axially and radially inwardly so as to overlie at least a part of said head portion, and self-adjusting retaining means for restraining said head portion from movement with respect to said housing, said self-adjusting restraining means comprising a generally annular expanded split ring bearing member in contact with the radially extending portion of said cap and said segmental spherical head portion but spaced from said axially extending portion such that axial movement of said stud causes simultaneously therewith radial expansive movement of the bearing member in a direction generally normal to said axial movement.

(References on following page)

References Cited

UNITED STATES PATENTS

| | | |
|---|---|---|
| 2,182,601 | 12/1939 | Venditty. |
| 2,913,268 | 11/1959 | Booth. |
| 2,924,469 | 2/1960 | Moskovitz. |
| 2,971,787 | 2/1961 | Lincoln. |
| 3,041,094 | 6/1962 | Herbenar _____ 287—87 |
| 3,154,332 | 10/1964 | Scheublein et al. _____ 287—87 |
| 3,220,755 | 11/1965 | Gottschald et al. _____ 287—87 |
| 3,262,706 | 7/1966 | Hassan. |

FOREIGN PATENTS

| | | |
|---|---|---|
| 1,317,537 | 11/1963 | France. |
| 582,421 | 8/1933 | Germany. |
| 205,689 | 10/1923 | Great Britain. |
| 929,873 | 6/1963 | Great Britain. |

EDWARD C. ALLEN, *Primary Examiner.*

ANDREW V. KUNDRAT, *Assistant Examiner.*